United States Patent [19]

Foos

[11] Patent Number: 4,933,394

[45] Date of Patent: Jun. 12, 1990

[54] MODIFIED ELECTRICALLY CONDUCTIVE POLYMERS

[76] Inventor: Joseph S. Foos, 17 Wilmot Rd., Waltham, Mass. 02154

[21] Appl. No.: 45,096

[22] Filed: May 1, 1987

[51] Int. Cl.$^5$ ............................................. C08F 8/04
[52] U.S. Cl. .................... 525/326.7; 525/279; 525/343; 525/351; 525/353; 525/375; 525/382; 525/383
[58] Field of Search ............................ 525/383, 326.7

[56] References Cited

U.S. PATENT DOCUMENTS

| | | | |
|---|---|---|---|
| 4,304,465 | 12/1981 | Diaz | 350/357 |
| 4,401,545 | 8/1983 | Naarmann et al. | 204/291 |
| 4,427,513 | 1/1984 | Skotheim et al. | 204/181 R |
| 4,468,291 | 8/1984 | Naarmann et al. | 204/13 |
| 4,487,667 | 12/1984 | Traynor | 528/423 |
| 4,487,996 | 12/1984 | Rabinowitz et al. | 174/105 R |
| 4,488,943 | 12/1984 | Skotheim | 204/58.5 |
| 4,488,987 | 12/1984 | Hocker et al. | 252/520 |
| 4,521,450 | 6/1985 | Bjorklund et al. | 427/121 |
| 4,532,188 | 7/1985 | Naarmann et al. | 428/500 |
| 4,548,696 | 10/1985 | Weaver, Jr. | 204/290 R |
| 4,552,927 | 11/1985 | Warren | 525/279 |
| 4,556,617 | 12/1985 | Kruger | 429/196 |
| 4,569,734 | 2/1986 | Naarmann et al. | 204/78 |
| 4,575,838 | 3/1986 | Meyer et al. | 369/276 |
| 4,582,575 | 4/1986 | Warren et al. | 204/12 |
| 4,585,581 | 4/1986 | Skotheim | 252/518 |
| 4,585,695 | 4/1986 | Ogasawara et al. | 428/364 |
| 4,609,971 | 9/1986 | Shaffer | 361/433 |
| 4,617,228 | 10/1986 | Newman et al. | 428/265 |
| 4,617,353 | 10/1986 | Myers | 525/245 |

OTHER PUBLICATIONS

Handbook of Conducting Polymers, pp. 93–95 (1986).
Diaz et al. (1982) J. Electroanal. Chem. 133:233–39.
Diaz et al. (1980) J.C.S. Chem. Comm., pp. 397–398.
Kanazawa et al. (1979/1980) Synthetic Metals, pp. 329–336.
Diaz et al. (1981) J. Electroanal. Chem. 129:115–32.
Foos et al. (Apr. 1, 1986) Abstract #128, published in vol. 86-1 of Proceedings of the Electrochem. Soc.
Valezquez et al., J. Electroanal. Chem. 185:297 (1985).
Waltman et al. (1986) Can J. Chem. 64:76–95.
Bidan et al., J. Chem. Soc. Chem. Comm., 1185 (1984).
Bidan et al., Nouv. J. Chem., 8(-9):501–03 (1984).

Primary Examiner—Joseph L. Schofer
Assistant Examiner—Bernard Lipman
Attorney, Agent, or Firm—Fish & Richardson

[57] ABSTRACT

A material that includes an organic polymer capable of being rendered electrically conductive by electrochemical oxidation or reduction, and a redox compound ionically or covalently bonded to the polymer. The redox potential of the redox compound is more positive than the redox potential of the polymer when the polymer is electrically conductive in the oxidized state and more negative than the redox potential of the polymer when the polymer is electrically conductive in the reduced state.

10 Claims, No Drawings

MODIFIED ELECTRICALLY CONDUCTIVE POLYMERS

This invention was made with Government support under National Science Foundation Grant No. ISI-8560494. The Government has certain rights in this invention.

BACKGROUND OF THE INVENTION

This invention relates to electrically conductive materials.

Organic polymers which become electrically conductive upon oxidation or reduction are known. Examples of such polymers include polyacetylene, poly-p-phenylene, and polyheterocycles, e.g., polypyrrole. Most are electrically conductive in the oxidized state, although polyacetylene is electrically conductive in both the reduced and oxidized states. Applications for these materials include batteries, electrodes, capacitors, and electrochromic display devices (where the material changes color upon being switched between its conductive and non-conductive forms).

SUMMARY OF THE INVENTION

In general, the invention features a material in which a redox compound (i.e. a compound capable of being reversibly electrochemically oxidized and reduced) is ionically or covalently bonded to an organic polymer capable of being rendered electrically conductive (i.e. having an electrical conductivity of at least $10^{-6}$ S/cm) by electrochemical oxidation (p-type conductor or reduction (n-type conductor). The redox compound improves the charge storage capacity (as measured by cyclic voltammetry) and rate behavior (i.e. rate at which that charge storage capacity is accessed, as measured by chronoamperometry or chronocoulometry) of the polymer.

P-type polymers are rendered electrically conductive when the applied electrical potential is more positive than the redox potential of the polymer. Similarly, n-type polymers become electrically conductive when the applied potential is more negative than the redox potential of the polymer. Thus, to ensure that the polymer remains electrically conductive while the redox compound is oxidized and reduced (which occurs when the material is used, e.g., as a pulsed power electrode), a redox compound having a redox potential more positive than the redox potential of the polymer is selected for use with p-type polymers. Similarly, n-type polymers require a redox compound having a redox potential more negative than the redox potential of the polymer.

Where the redox compound is covalently bonded to the polymer, the redox potential of the polymer refers to that of the redox compound-substituted polymer because upon covalent bonding, the redox potential of the polymer may change. However, no such change occurs in the case of ionic bonding; thus, in the case of ionic bonding, the redox potential of the polymer refers to that of the original, unsubstituted polymer.

In preferred embodiments, the polymer is polypyrrole, which is electrically conductive in the oxidized state. In the case of covalent bonding, the redox compound is preferably bonded to the 3- or 4- ring position of the polypyrrole. The pyrrole-based material of the invention preferably is made from both unsubstituted pyrrole and redox compound-substituted pyrrole.

Preferred redox compounds for polypyrrole are quinones or hydroquinones. A quinone is the oxidized form of a hydroquinone. Thus, either can be bonded to the polypyrrole initially and then reversibly converted to the other. For ionic bonding, the redox compound is a compound having an ionizable group, e.g., sulfonate or carboxylate group, through which ionic bonding can occur. Particularly preferred redox compounds are benzohydroquinone (for covalent bonding) and anthraquinone sulfonate (for ionic bonding).

The electrically conductive materials of the invention are preferably prepared by ionically or covalently bonding the redox compound to the polymer, and then oxidizing or reducing the polymer to render it electrically conductive. The redox compound can be bonded directly to the polymer or can be bonded first to the monomer, which is then polymerized to form the polymer.

The electrically conductive materials are useful in a variety of applications, including electrodes and electrochromic display devices. They exhibit increased charge storage capacity compared to the polymers alone because of the added contribution from the redox compound. Access to this capacity is also improved. In addition, they can be used in both aqueous and non-aqueous electrolytes.

Other features and advantages of the invention will be apparent from the following description of the preferred embodiments thereof, and from the claims.

DESCRIPTION OF THE PREFERRED EMBODIMENTS

We now describe preferred embodiments of the invention.

Structure and Preparation

Preferred electrically conductive materials are those in which the redox compound is covalently bonded to the polymer. Covalent bonding is preferred because it minimizes loss of the redox compound during electrochemical cycling. Where the polymer has several non-equivalent bonding sites, the redox compound is preferably bonded to the site that results in a substituted polymer having the least positive redox potential (for p-type polymers) or least negative redox potential (for n-type polymers). This is desirable because less positive (for p-type polymers) or less negative (for n-type polymers) applied potentials are then required to render the material electrically conductive. This in turn permits use in a variety of electrolytes, including aqueous electrolytes, because the applied potential will not decompose the electrolyte.

Examples of polymers that, because they can be rendered electrically conductive upon electrochemical oxidation or reduction, are useful in the invention include polypyrrole (oxidation), polyisothionaphthene (oxidation), polythiophene (oxidation), poly-p-phenylene (oxidation), and polyacetylene (oxidation or reduction). The preferred polymer is polypyrrole.

An appropriate redox compound is selected based upon the redox potential of the polymer. For p-type polymers, the redox potential of the redox compound is more positive than the redox potential of the polymer, while for n-type polymers, the redox potential of the redox compound is more negative than the redox potential of the polymer. For example, where the redox compound is bonded to the 3-position of the pyrrole ring in a polypyrrole polymer, the redox potential of the redox compound is more positive than the redox potential of the 3-substituted polypyrrole. The initial step in choosing a redox compound for use with a given polymer is to choose a redox compound - unsubstituted polymer pair whose redox potentials have the relationship described above. Where the redox compound is to be ionically bonded to the polymer, this step completes the selection, because the redox potential of the polymer remains the same before and after bonding to the redox compound. Covalent bonding, on the other hand, may change the redox potential of the polymer. Thus, the redox compound-unsubstituted polymer pairs which satisfy the above relationship must, if covalent bonding is to be used, be so bonded, and then tested to determine the redox potential of the resultant substituted polymer, e.g., using cyclic voltammetry. This value is then compared to the redox potential of the redox compound alone to determine whether the redox compound and substituted polymer satisfy the above - described required redox potential relationship.

Suitable redox compounds are generally aromatic resonance-stabilized structures and may be in the form of single, dimeric, oligomeric, or polymeric compounds. Examples of redox compounds include the following:

1. aromatic amines and diamines, e.g., tetramethyl phenylene diamine;
2. quaternary dipyridyl salts, e.g., methyl viologen;
3. nitrogen-containing heterocycles, e.g., phthalocyanines, porphyrins, and coenzymes involved in the electron transport system, e.g., NADH and FAD; 4. complexed metal ions, e.g., ferrous 2,2'-bipyridine sulfate and metalloporphyrins; 5. nitro and nitroxide compounds, e.g., TEMPO (tetramethyl piperidinyl-1-oxy); 6. nitrogen, sulfur, or oxygen - containing compounds forming stabilized carbonium ions upon oxidation, e.g, tetrathiofulvalene and tetrakis-N,N-dimethyl amino ethylene; 7. cyano compounds forming stabilized anions upon reduction, e.g., tetracyanoethylene and TCNQ; 8. disulfides, e.g., phenyl disulfide; 9. thioquinones; 10. dyes capable of redox behavior, e.g., cyanines, and anilines; 11. triphenylmethanes; 12. azo, nitroso, and azoxycompounds; 13. pyrazine and other oxygen, sulfur, or nitrogen-polysubstituted heterocycles that exhibit redox behavior e.g., 5,10-dihydro- 5,10-dimethyl phenazine; 14. quinones, e.g., benzoquinone and anthraquinone.

Where the polymer is polypyrrole, substitution at the 3-(or equivalent 4-) position causes the least positive shift in redox potential, the redox potential of the substituted polymer being nearly identical to that of the unsubstituted polymer. Thus, a redox compound whose redox potential is more positive than the redox potential of unsubstituted polypyrrole is preferably used. The preferred redox compound is a quinone or hydroquinone, e.g., benzohydroquinone or anthraquinone. For ionic bonding, the redox compound is one having an ionizable group for bonding to the polymer, e.g., anthraquinone sulfonate. Example 1

Poly-3-benzohydroquinone-pyrrole was prepared as follows.

Pyrryl magnesium bromide (prepared via a Grignard reaction from N-bromo-pyrrole) was reacted with alpha-bromo-2,5-dimethoxytoluene to form a mixture of pyrrole monomers substituted at the 2- and 3-positions with 1,4 dimethoxybenzene. The 3-substituted isomer (30 mg) was then isolated and electrochemically oxidized galvanostatically in 0.1 M LiClO$_4$/propylene carbonate electrolyte on a platinum substrate in the presence of 0.2 - 1.0 mg unsubstituted pyrrole monomer to form a black polypyrrole film substituted at the 3-position with 1,4 dimethoxybenzene. 50 mC/cm$^2$ charge was used. The film was then treated with BBr$_3$ to convert the 1,4 dimethoxybenzene to benzohydroquinone. The film was stable in aqueous solution.

The oxidation potential of the substituted pyrrole polymer is approximately -0.25V vs. SCE as measured in an aprotic solvent. The redox potential of the benzohydroquinone redox compound is approximately 0.4V vs. SCE as measured in a protic solvent. Thus, when an electrical potential above about +0.4V is applied to the film, the film is electrically conductive and both the polymer and redox compound are in oxidized form (i.e. the redox compound is present as a quinone). When the applied potential is between about −0.25V and +0.4V, the film remains electrically conductive because the polymer is still in oxidized form, but the redox compound is now in reduced, i.e. hydroquinone, form. The film can be cycled between the oxidized and reduced forms of the redox compound, while the polymer remains electrically conductive. If the applied potential is below −0.25V, the film is nonconductive because the oxidized Polymer has been neutralized; the redox compound remains in hydroquinone form. Example 2

An ionically bonded polypyrrole/anthraquinone sulfonate film was prepared as follows.

30mg of unsubstituted pyrrole monomer was added to an aqueous electrolyte solution containing 0.1M sodium beta-anthraquinone sulfonate. The solution was then electrochemically oxidized galvanostatically on a platinum substrate to form a black film consisting of polypyrrole with ionically bonded anthraquinone sulfonate compounds. 50 mC/cm$^2$ charge was used to form the film. The film was stable in 0.1M phosphate buffered saline.

Use

The electrically conductive materials can be used as electrodes, and are particularly useful as pulsed power electrodes for high rate batteries. The materials can also be incorporated in batteries or as display elements in electrochromic display devices Where the materials are transmissive in either the electrically conductive or nonconductive states, they can be incorporated as the active elements in transmissivity modulation devices. Another application is as catalysts for the oxidation or reduction of other materials.

In still another application, the materials can be used as sensor electrodes for detecting chemical substances capable of participating in electron transfer reactions with the redox compound of the materials. For example, neurotransmitters such as dopamine and ACTH undergo electron transfer reactions with quinones, thereby changing the redox rate of the quinone. And each different quinone reacts differently with a given neurotransmitter, so that the response of the electrode, made with a particular quinone, will vary, depending on the neurotransmitters, and their relative amounts, present in a sample. Thus the presence of, e.g., dopamine in a brain fluid sample could be detected by monitoring the current flow to, e.g., a quinone-substituted polypyrrole sensor electrode, the change in current flow reflecting the change in redox rate. Similarly, where the redox compound of the sensor electrode is an enzyme, the electrode can be used to detect the presence of an enzyme substrate by measuring the current flow (and thus the change in redox rate that occurs when the enzyme interacts with the substrate through an electron transfer reaction) to the electrode.

Other embodiments are within the following claims.

I claim:

1. A material comprising, an organic polymer capable of being rendered electrically conductive by electrochemical oxidation ; and a redox compound covalently bonded to said polymer, the redox potential of said redox compound being more positive than the potential of said polymer when said polymer is electrically conductive in the oxidized state, wherein said polymer comprises polypyrrole and said redox compound is covalently bonded to said polypyrrole in at least one of the 1-, 3- and 4-ring positions.

2. The material of claim 1 wherein said redox compound comprises a quinone or hydroquinone.

3. The material of claim 1 wherein said redox compound comprises a quinone or hydroquinone having an ionizable group.

4. The material of claim 1 wherein said redox compound comprises benzohydroquinone.

5. The material of claim 1 wherein said redox compound comprises anthraquinone sulfonate.

6. The material of claim 1 wherein said Polymer comprises polypyrrole, said redox compound comprises benzohydroquinone, and said benzohydroquinone is covalently bonded to said polypyrrole at the 3- or 4-ring position.

7. The material of claim 1 wherein said material is in the form of an electrode.

8. The material of claim 1 wherein said material is in the form of a display element in an electrochromic display device capable of participating in electron transfer reactions with said redox compound..

9. The material of claim 1 wherein said material is in the form of a sensor electrode for detecting chemical substances capable of participating in electron transfer reactions with said redox compound.

10. A product prepared by a process comprising the steps of providing a monomer solution comprising unsubstituted pyrrole monomer and pyrrole monomer covalently bonded to a redox compound; and electrochemically polymerizing and oxidizing said monomer solution to form an electrically conductive material.

* * * * *